Nov. 28, 1967    R. A. KLEEHAMMER    3,355,031
CAR CLOTHES RACK
Filed Oct. 21, 1965

*INVENTOR.*
RAYMOND A. KLEEHAMMER
*BY*
Whittemore, Hulbert & Belknap
ATTORNEYS

United States Patent Office 3,355,031
Patented Nov. 28, 1967

3,355,031
CAR CLOTHES RACK
Raymond A. Kleehammer, 2929 Burns Ave.,
Detroit, Mich. 48214
Filed Oct. 21, 1965, Ser. No. 499,323
1 Claim. (Cl. 211—123)

ABSTRACT OF THE DISCLOSURE

The hanger comprises telescoping tubular rods of circular cross-section. The bottom wall portion at the outer end of each rod is deformed radially inwardly toward the top wall portion, such top and bottom wall portions contacting one another throughout substantially 180° of downward curvature. An aperture is provided adjacent the outer extremity of each rod to receive the upwardly projecting hooks within the passenger space of an automobile.

This invention relates generally to a hanger for clothes and the like and refers more particularly to a clothes hanger for use in an automobile.

It is an essential object of this invention to provide a hanger for clothes and the like which is of a simple construction and adapted to be attached to the hooks provided within the passenger space on opposite sides of the vehicle body.

Another object of the invention is to provide a hanger comprising telescoping tubular rods having flattened outer ends and apertures through the flattened ends for receiving the hooks in the passenger space of an automobile.

Another object is to provide a hanger having telescoping tubular rods which are of uniform circular cross-section from their telescoping ends throughout the major portion of their lengths, but having apertured flattened outer ends for engaging the hooks in the passenger space of an automobile.

Another object is to provide a hanger in which one of the walls at the outer end of each rod is undeformed and retains its full circular cross-section and the opposite wall is deformed radially inwardly and into full surface-to-surface contact with the undeformed wall.

Another object is to provide a hanger in which the top wall of the outer end of each rod is undeformed and retains its full circular cross-section, and the bottom wall is deformed radially inwardly into full surface contact with the top wall, the top and bottom walls being approximately 180° in circumferential extent, and the apertures being formed in the top and bottom walls at the midpoint of the circumferential extend thereof.

Other objects and features of the invention will become apparent as the description proceeds, especially when taken in conjunction with the accompanying drawing, wherein.

Figure 1:
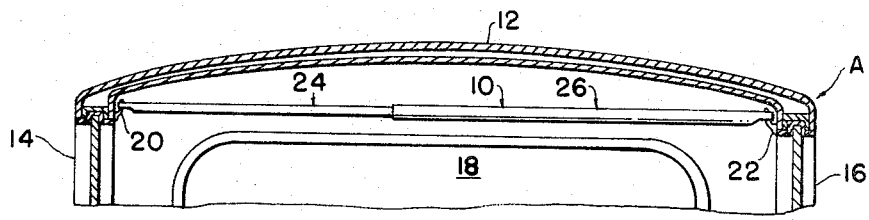
FIGURE 1 is a fragmentary cross-section through the upper portion of a vehicle body showing the hanger of my invention extending across the passenger space and attached to hooks on the opposite sides of the vehicle body.
Figure 2:
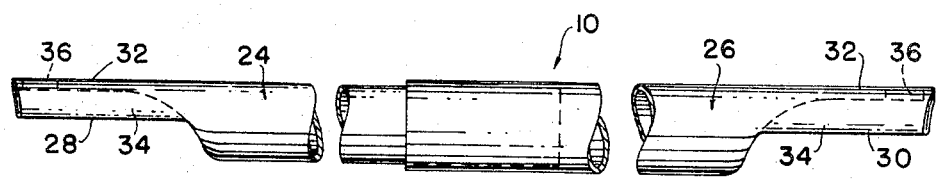
FIGURE 2 is an enlarged side elevational view, with parts broken away, of the hanger shown in FIGURE 1.

Referring now more particularly to the drawings, the hanger of my invention is a rod assembly. It is generally designated 10 and is shown in FIGURE 1 in use in an automobile. The automobile is generally designated A, and includes the roof 12 and sides 14 and 16 defining the passenger space 18. There are upwardly projecting hooks 20 and 22 on the two sides of the vehicle within the passenger space, and the hanger or rod assembly 10 is attached to the hooks when in use.

The rod assembly 10 comprises the two elongated tubular rods 24 and 26 which are of identical construction except that the rod 24 is slightly smaller in diameter so as to telescope within the rod 26.

Figures 3, 4:
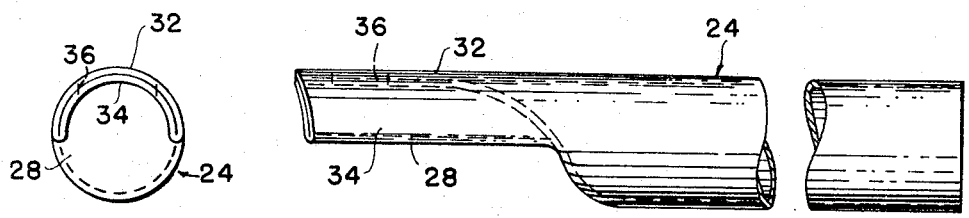
FIGURE 3 is an end view of the hanger, as seen from the right in FIGURE 2.
FIGURE 4 is an enlargement of one of the rods shown in FIGURE 2, with parts broken away.

The rods 24 and 26 are of uniform circular cross-section from their telescoping ends throughout substantially their full lengths except at their outer ends. The outer ends of the rods are designated 28 and 30 and are flattened as illustrated. Specifically, each of the outer flattened ends 28 and 30 has a top wall 32 which is undeformed and retains the full circular cross-section of the remaining length of the rod. The bottom wall 34 at the outer end of each rod is deformed radially inwardly toward the top wall. The top and bottom walls 32 and 34 are 180° in circumferential extent as seen in FIGURE 3, and are in full surface-to-surface contact with each other throughout the full 180°. This surface contact extends from the outer extremities of the rods axially inwardly a substantial distance as indicated in FIGURE 4, there being a transition from the flattened condition to the full circular cross-section of the rod where the walls diverge from one another.

Figure 5:
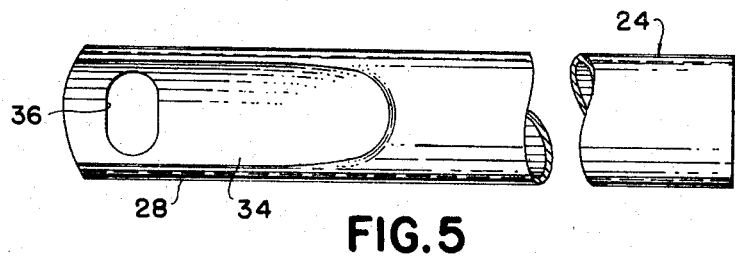
FIGURE 5 is a bottom plan view of the rod shown in FIGURE 4.

Each flattened outer end 28, 30 of the rods has an aperture 36. Actually, the aperture is composed of aligned identical openings in the top and bottom walls 32 and 34 of each flattened end. The apertures are transversely elongated as shown in FIGURE 5. They are centered transversely, that is they are located at the midpoint of the circumferential extent of the top and bottom walls of each flattened end portion as well be apparent in FIGURE 5.

In use, the rod assembly 10 is adjusted as to length by virtue of the sliding telescoping engagement of the two rods. The rods are of uniform inside and outside circular cross-section throughout substantially their full lengths except at their outer flattened ends, so that they will slide axially very readily with respect to one another. The apertured flattened ends of the axially adjusted rod assembly are then engaged over the hooks 20, 22, with the hooks projecting upward through the apertures 36. Preferably, the rod assembly is oriented as illustrated in FIGURES 1-4 so that the apertures 36 are at the top of the rod assembly wtih the walls 32 and 34 curving downward on opposite sides of the hooks for greater stability.

The rods can also rotate relative to one another so that a slight adjustment may be made, as required, to enable an aperture of the rod assembly to engage a bent or otherwise deformed hook.

The rod assembly can easily be detached by elevating it to disengage the apertured ends from the hooks. When not in use, the rod assembly will be fully telescoped to reduce its overall length for move convenient storage.

The rods are preferably made of metal, but may be made of any other suitable material.

What I claim as my invention is:

A hanger for clothes and the like for use in an automobile having upwardly projecting hooks within the passenger space on opposite sides thereof, said hanger comprising elongated, straight, telescoping tubular rods, said rods being of uniform circular cross-section from their telescoping ends throughout substantially their full lengths except at their outer ends, the top wall portion at the outer end of each rod being undeformed and retaining the full circular cross-section of the remaining length of the rod, the bottom wall portion at the outer end of each rod being deformed radially inwardly toward said top wall portion to a downwardly concave condition concentric with said top wall portion, said top and bottom wall portions at the outer end of each rod being substantially 180° in circumferential extent and in substantially full surface-to-surface contact throughout said 180° to provide a reinforced double wall end structure of limited axial extent and of substantial strength, and aligned, registering apertures in the contacting top and bottom wall portions adjacent the outer extremity of each rod, said aligned apertures being located at the midpoint in the circumferential extent of said contacting top and bottom wall portions at the outer end of each rod and adapted to receive one of said hooks with the portions of said contacting top and bottom wall portions circumferentially beyond said apertures extending downwardly alongside said hooks to provide a stable mounting, said rods being axially slidable relative to one another to adjust the overall length of said telescoping rods to correspond to the distance between said hooks or to foreshorten the same when not in use.

References Cited

UNITED STATES PATENTS

| | | | |
|---|---|---|---|
| 1,554,212 | 9/1925 | Henry | 211—123 X |
| 2,478,337 | 8/1949 | Strasser | 211—123 X |
| 2,543,202 | 2/1951 | Robinson | 211—123 X |
| 2,881,017 | 4/1959 | Miller | 211—123 X |

CHANCELLOR E. HARRIS, *Primary Examiner.*